US012801741B2

(12) United States Patent
Gvili et al.

(10) Patent No.: US 12,801,741 B2
(45) Date of Patent: Nov. 17, 2026

(54) SECURING FILE DOWNLOAD BY FILE IN FILE EMBEDDING

(71) Applicant: Check Point Software Technologies, Ltd., Tel Aviv (IL)

(72) Inventors: Nadav Tovia Gvili, Tel Aviv (IL); Omer Zadik, Holon (IL); Oren Segev, Kfar Sirkin (IL); Ofer Benjamin Barkai, Givatayim (IL); Tal Ashkenazi, Mevaseret Zion (IL); Karin Haim, Ramat Gan (IL); Evgeniya Laskavi Straznik, Holon (IL); Guy Elyashiv, Tel Aviv (IL)

(73) Assignee: Check Point Software Technologies, Ltd., Tel Aviv (IL)

( * ) Notice: Subject to any disclaimer, the term of this patent is extended or adjusted under 35 U.S.C. 154(b) by 67 days.

(21) Appl. No.: 19/008,035

(22) Filed: Jan. 2, 2025

(65) Prior Publication Data

US 2026/0187247 A1 Jul. 2, 2026

(51) Int. Cl.
*G06F 21/56* (2013.01)
*G06F 21/53* (2013.01)
*G06F 21/60* (2013.01)

(52) U.S. Cl.
CPC ............ *G06F 21/566* (2013.01); *G06F 21/53* (2013.01); *G06F 21/602* (2013.01)

(58) Field of Classification Search
CPC ....... G06F 21/566; G06F 21/53; G06F 21/602
See application file for complete search history.

(56) References Cited

U.S. PATENT DOCUMENTS 10,904,285 B1 * 1/2021 Saxonberg .......... G06F 3/04847
2024/0089285 A1 * 3/2024 Jakobsson ............ H04L 51/212

* cited by examiner

*Primary Examiner* — Theodore C Parsons
(74) *Attorney, Agent, or Firm* — Renner, Otto, Boisselle & Sklar, LLP

(57) ABSTRACT

A system, method, and computer device are provided for securing downloaded files by embedding the original file within a sanitized version of the downloaded file, allowing a user to access the sanitized file without requiring separate remote storage of the original. The requested file is downloaded and subjected to threat extraction to produce a sanitized version of the original file. The sanitized file is then combined with the original file to form a file-in-file data structure, such that a user may access the sanitized file. When the user requests access to the original file, the system performs threat emulation within a sandboxed environment to determine whether the file is malicious. If found to be benign, unlocking information is provided so that the user can extract the original file from the sanitized file-in-file data structure, all without needing to maintain the original file on a separate system or device.

19 Claims, 4 Drawing Sheets

SECURING FILE DOWNLOAD BY FILE IN FILE EMBEDDING

TECHNICAL FIELD

The present disclosure relates generally to threat prevention and more particularly to securing downloaded files.

SUMMARY

Cybersecurity solutions designed to prevent the introduction of malicious software into an organization's computing environment may rely on techniques such as threat extraction and threat emulation. Threat extraction generally involves scanning a file for potentially harmful elements, removing or sanitizing suspicious content, and generating a "cleaned" version of the file to the user. Threat emulation, on the other hand, typically involves opening or executing the file within a sandboxed environment to detect malicious activities.

Although effective, existing solutions commonly require that the original file be temporarily stored on a remote server. This approach ensures that the original file remains accessible if a user requires it—such as in situations where legitimate content has been removed or when a digital signature must be verified. However, maintaining this storage introduces additional burdens, including increased use of server resources, additional compute and networking overhead, and potential privacy or security concerns associated with storing sensitive files remotely (i.e., away from a user's computer).

Moreover, performing threat emulation immediately for every file is a resource-intensive process. Emulating each file in a sandbox environment consumes significant processor cycles and prolongs the time required before the user can access the file. While threat extraction alone can quickly deliver a sanitized version to the user, this sanitized version may omit certain critical content, prompting the user to request the original file. If the original file has been stored remotely, retrieving it incurs bandwidth usage, and the associated waiting time can degrade the user experience.

Accordingly, there is a need for an improved method of file handling that optimizes resource usage, reduces reliance on remote file storage, and still permits users to access the original file on demand. Such a solution enables quick delivery of a sanitized file to the user, while potentially delaying the resource-intensive threat emulation until a user requests the original file. This can significantly reduce unnecessary computations and network traffic, improve user satisfaction, and minimize security and privacy risks associated with storing the original file on remote servers.

The present disclosure provides an electronic device, system, and method for securing downloaded files by embedding the original file in a sanitized version of the downloaded file, such that a user may access the sanitized file and request access to the original file without requiring the original file be maintained on a separate system or device.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the many ways in which the principles of the invention may be employed. Other objects, advantages, and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

Figure 1:
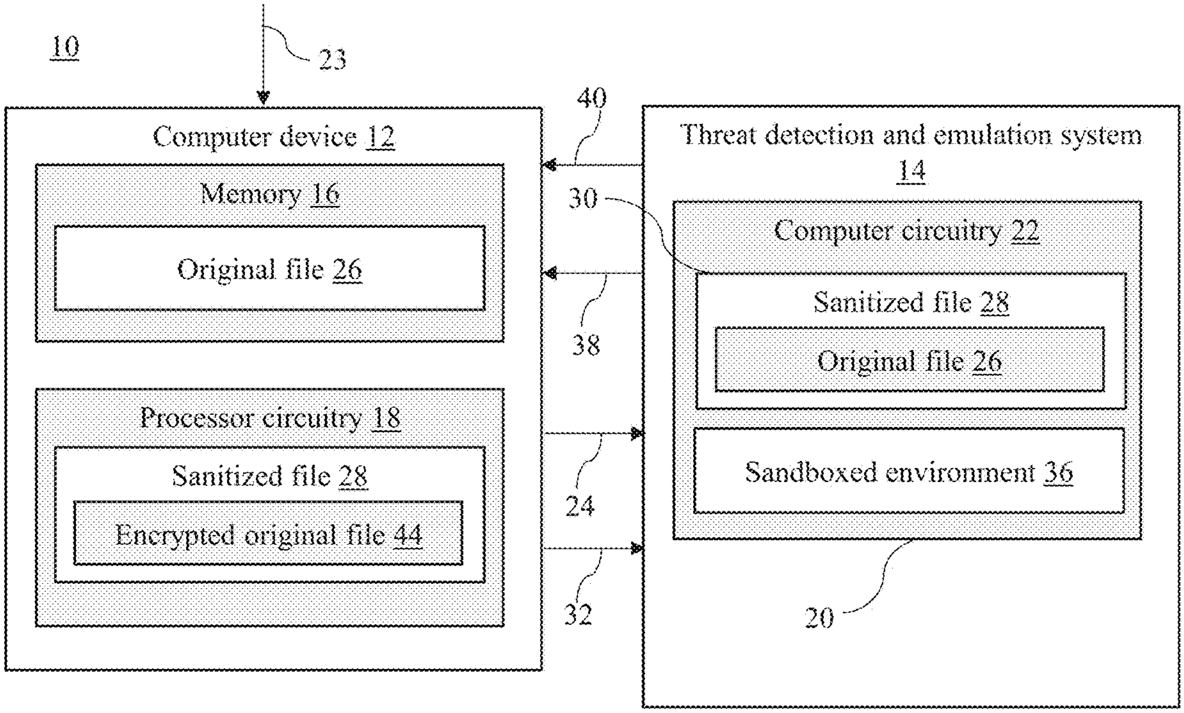
FIG. 1 is a block diagram of an embodiment of a system for securely accessing a downloaded file.

The present invention is described below in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

The present disclosure provides a system, method, and computer device for securing downloaded files by embedding the original file within a sanitized version of the downloaded file, allowing a user to access the sanitized file without requiring separate remote storage of the original. The requested file is downloaded and subjected to threat extraction to produce a sanitized version of the original file. The sanitized file is then combined with the original file to form a file-in-file data structure, such that a user may access the sanitized file while still having a copy of the original file. When the user requests access to the original file, the system performs threat emulation within a sandboxed environment to determine whether the file is malicious. If found to be benign, unlocking information is provided so that the user can extract the original file from the sanitized file-in-file data structure, all without needing to maintain the original file on a separate system or device.

According to a general embodiment shown in in FIG. 1, a system 10 is presented for securely accessing a downloaded file. The system 10 includes a computer device 12 and threat detection and emulation system 14. The computer device 12 includes memory 16 and processor circuitry 18. The threat detection and emulation system 14 includes an electronic device 20 having computer circuitry 22 configured to perform threat extraction.

Figure 3:
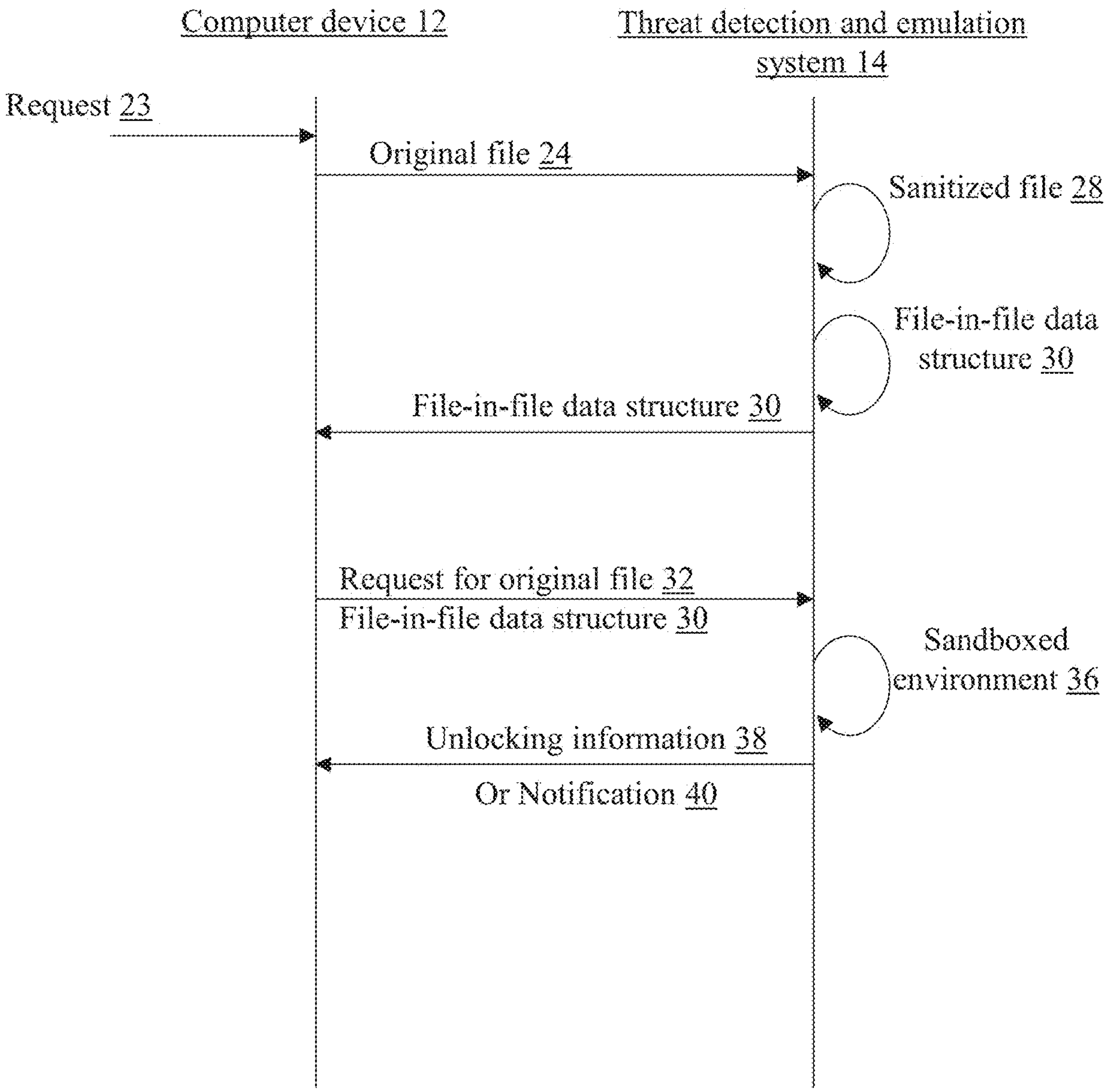
FIG. 3 is a ladder diagram of an embodiment of the system of claim 1 showing operations performed by a computer device and a threat detection and emulation system.

With exemplary reference to FIG. 3, the processor circuitry 18 receives a request 23 from a user for downloading a file 24 from a remote source (such as a website, server, etc.). For example, the request 23 may be generated by a user attempting to open an attachment to an email, clicking a link to download a file on a website, etc. The processor circuitry 18 then sends a request for threat detection of the requested file 24 by the threat detection and emulation system 14. The request may be the sending of the requested file 24 by the computer device 12 to the threat detection and emulation system 14.

The electronic device 20 of the threat detection and emulation system 14 performs threat detection and threat emulation. Threat detection begins with the threat detection and emulation system 14 receiving the requested file 24 (also referred to as an original file 26). The electronic device 20 then generates a sanitized file 28 from the original file 26. The sanitized file 28 may be generated by scanning the original file 26 to identify potentially harmful elements such as code, macros, scripts, or embedded executable content, removing or neutralizing those elements, and producing a cleaned version of the file that is free of such threats while preserving allowed content.

The threat detection and emulation system 14 generates and outputs a file-in-file data structure 30 by embedding the original file 26 in the sanitized file 28. For example, the threat detection and emulation system 14 may embed the original file 26 in the sanitized file 28 by obfuscating a location 42 of the original file 26 in the sanitized file 28 and/or encrypting the original file 26 such that an encrypted original file 44 is stored in the file-in-file data structure 30.

As an example for DOCX file types, the sanitized version of the DOCX file can be unzipped and the original DOCX file may be stored within the sanitized file. The sanitized file can then be accessed as a "normal" DOCX file, with the original DOCX file hidden within the sanitized DOCX file. Similarly, the PDF file format supports embedding objects within a PDF file. For this reason, the original PDF file may be embedded within the sanitized PDF (e.g., by splitting the original file into multiple parts and embedding the multiple parts within the sanitized PDF).

The techniques for embedding the original file within the sanitized file are not limited to DOCX or PDF formats. For example, other file containers such as ZIP archives, ISO images, or containerized file formats used in productivity suites or specialized applications can also be used. Embedding the original file may involve inserting binary data segments into reserved portions of the sanitized file, appending the original file data to the sanitized file's data sections, or leveraging existing file structure features (e.g., PDF object streams, Office XML components, or custom metadata fields) to conceal the original file. The method of embedding may be chosen based on security requirements, compatibility with user applications, and the complexity of subsequent extraction operations.

As described above, by using a file-in-file data structure 30 a copy of the original file 26 does not need to be retained on a device other than the computer device 12. That is, because the original file 26 is embedded in the sanitized file 28, the computer device 12 may send the file-in-file data structure 30 to the threat detection and emulation system 14 for threat emulation when the original file 26 is requested. In this way, the threat detection and emulation system 14 does not need to retain a copy of the original file.

The computer device 12 receives the file-in-file data structure 30 output from the threat detection and emulation system 14. The computer device 12 accesses the sanitized file 28 via the file-in-file data structure 30. For example, the original file 26 may be a PDF and the sanitized file 28 may be a version of the PDF with any potential malicious elements removed. Accessing the sanitized file 28 may result in the sanitized PDF being displayed to a user.

Because the sanitized file 28 may have important information or capabilities removed (e.g., macros, etc.), a user may require access to the original file. When the original file 26 is desired, the user may request the original file 26 and the computer device 12 may generate a request 32 for the original file 26. As is described in further detail below, the request 32 may result in the threat detection and emulation system 14 performing threat emulation or the threat emulation may have already begun and the request 32 may trigger the threat detection and emulation system to output a result of threat emulation (e.g., unlocking information) once completed.

The computer device 12 or intermediary 50 may enforce a policy governing how access is granted to the original file 26. This policy may specify when unlocking information 38 is provided. For example, the policy may specify whether a verdict from the threat detection and emulation system 14 is required before unlocking information 38 is provided. As an example, depending on organizational settings, a user may only receive the original file if it is identified as benign by the threat detection and emulation system 14. Conversely, the policy may permit immediate access to the original file without waiting for a verdict. As a result, when the user receives the file-in-file data structure 30 containing both the sanitized file 28 and requests access to the original file, the policy may dictate whether further analysis (i.e., threat emulation) or unlocking information 38 is required before the user is granted access to the original file.

All actions, requests, and policy decisions may be logged for auditing and compliance purposes. For instance, each request for the original file, each policy check, and each verdict issued by the threat detection and emulation system 14 may be recorded. These logs may be used for security reviews, regulatory compliance, forensic analysis in the event of a security incident, etc.

The file-in-file data structure 30 may include a user-clickable hyperlink or URL. This hyperlink/URL may point to a server, which can be hosted locally on the end user's machine or implemented as part of the intermediary 50. By selecting the hyperlink/URL, the user may be provided with a user interface (UI) that allows the file-in-file data structure 30 to be uploaded to the server for further processing. Upon receiving the uploaded file-in-file data structure 30, the server may determine whether to grant access to the original file 26 based on the applicable policy and, if necessary, may initiate or finalize threat emulation. If unlocking information 38 is required before the user is granted access to the original file, the computer device may request and receive that unlocking information.

The threat detection and emulation system 14 performs threat emulation using the original file 26. For example, the threat detection and emulation system 14 may receive the request 32 for the original file. The request 32 may include the file-in-file data structure 30. That is, the computer device 12 may include the file-in-file data structure 30 with the request 32 to access the original file. The threat detection and emulation system 14 may then open the original file 26 included in the file-in-file data structure 32 in a sandboxed environment 36.

The sandboxed environment 36, as used by the threat detection and emulation system 14, may be a controlled, isolated computing environment designed to safely execute potentially harmful files. This environment can be implemented as a virtual machine (VM), a lightweight container, or an emulated software environment running on dedicated hardware. By providing a strictly contained runtime with limited privileges, restricted system calls, and closely monitored interactions with the operating system, the sandboxed environment may prevent any malicious code embedded within the original file from affecting other parts of the computing system or the broader network. The isolation ensures that even if the file attempts to perform harmful operations—such as modifying critical system files, installing unauthorized software, or accessing confidential data—these actions are contained within the sandbox and cannot directly impact the host system or other networked resources.

The threat detection and emulation system 14 then monitors the sandboxed environment 36 to detect whether the opening of the original file 26 resulted in malicious behavior. When the threat detection and emulation system 14 does not detect malicious behavior during the monitoring of the sandboxed environment 36, the threat detection and emulation system 14 identifies the original file 26 as benign. Alternatively, when the threat detection and emulation system 14 does detect malicious behavior while monitoring the sandboxed environment 36, the threat detection and emulation system 14 identifies the original file as malicious.

To monitor the sandboxed environment 36 for malicious behavior, the threat detection and emulation system 14 may employ a variety of detection techniques and behavioral analysis tools. The system 14 may record and analyze low-level system calls, registry modifications, file writes, process creations, and network requests made within the sandbox 36. Sophisticated heuristic algorithms, machine learning models, or signature-based detection rules may be applied to identify patterns indicative of malicious activity, such as attempts to escalate privileges, exfiltrate data, disable security services, or mask processes. In some embodiments, the threat detection and emulation system 14 can simulate user inputs or system responses to provoke the file into revealing any hidden malware routines.

Furthermore, timing-based analysis may be performed to detect malware that intentionally delays execution or attempts to detect the presence of a sandbox. By continuously monitoring these system interactions and evaluating them against known malicious behaviors, the threat detection and emulation system 14 can accurately determine if the original file is benign or malicious before releasing any unlocking information.

Figure 2:
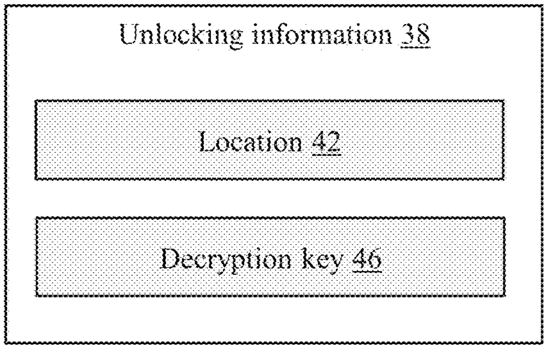
FIG. 2 is a block diagram of unlocking information.

When the original file 26 is identified as benign, the threat detection and emulation system 14 outputs unlocking information 38 for extracting the original file 26 from the file-in-file data structure 30. As shown in FIG. 2, the unlocking information 38 may include the location 42 of the original file 26 within the file-in-file data structure 30, thereby enabling extraction of the original file. Alternatively or additionally, the unlocking information 38 may include a decryption key 46 for decrypting the original file 26 (i.e., the encrypted original file 44) within the file-in-file data structure 30, thereby enabling extraction of the original file 26.

The unlocking information 38 may be provided in various forms. For example, if the original file is concealed via encryption, the unlocking information 38 may include a cryptographic key. If the original file is concealed by a locational offset within a structured file format, the unlocking information may specify a byte offset, a particular embedded object identifier, or a reference to a specific file component. In some implementations, the unlocking information may be accompanied by additional metadata, such as file integrity checks, digital signatures to verify authenticity, or watermarks to prevent unauthorized distribution. This flexibility ensures that the unlocking process can be adapted to a wide variety of file formats, security levels, and organizational requirements.

Conversely, when the original file 26 is identified as malicious, the threat detection and emulation system 14 withholds the unlocking information 38 for extracting the original file 26 from the file-in-file data structure 30. For example, when the original file 26 is identified as malicious, the threat detection and emulation system 14 may output a notification 40 that the original file has been identified as malicious.

As shown in FIG. 3, when the original file 26 is identified as benign, the computer device 12 receives the unlocking information 38. The computer device 12 then extracts the original file 26 from the file-in-file data structure 30 using the unlocking information 38. The computer device 12 stores (at least temporarily) the extracted original file 26 in the memory 16 of the computer device 12. For example, the computer device 12 may separately store the original file 26 in the memory for later access. As another example, the computer device 12 may store the original file 26 in the memory for immediate access (e.g., in temporary storage of the operating system for the computer device 12).

When the original file 26 is identified as malicious, the computer device 12 may receive the notification 40 from the threat detection and emulation system 14 indicating that the original file 26 has been identified as malicious. The computer device 12 may display a visual warning upon receiving the notification 40.

As described briefly above, the threat detection and emulation system 14 may perform threat emulation immediately upon receiving the original file 26 for threat extraction or the threat detection and emulation system 14 may wait to perform threat emulation until the request 32 is received for accessing the original file 26.

As shown in FIG. 3, when waiting to perform threat emulation, the request 32 for the original file 26 includes the file-in-file data structure 30. The threat detection and emulation system receives the request 32 for the original file (including the file-in-file data structure 30) before opening the original file 32 in the sandboxed environment 36, such that the threat emulation is performed upon receiving the request for the original file.

Conversely, when performing threat emulation automatically, the threat detection and emulation system 14 performs threat emulation upon receiving the original file 26 for threat extraction and before receiving the request 32 for the original file. In this way, threat emulation is initiated automatically. Then, after receiving the request 32 for the original file and when the original file is identified as benign, the threat detection and emulation system 14 outputs the unlocking information 38.

In certain embodiments, organizational policies or administrator-defined rules determine when to initiate threat emulation. For example, a policy may specify that threat emulation is only performed if the user explicitly requests the original file, or that emulation should be delayed until off-peak hours to reduce computational load. Other policies may require pre-emptive threat emulation for files above a certain size or originating from untrusted sources, ensuring that high-risk files are evaluated well in advance. These flexible policies allow organizations to balance resource utilization against user convenience, tailoring the timing of threat emulation to specific security and operational needs.

Waiting to perform threat emulation has the benefit of minimizing computational resources until the original file is requested. Because the original file is typically not requested by a user, refraining from automatically performing threat emulation prevents unnecessary use of computer resources. Conversely, by performing threat emulation automatically (i.e., before a user requests the original file), user wait time for receiving the original file can be reduced.

Figure 4:
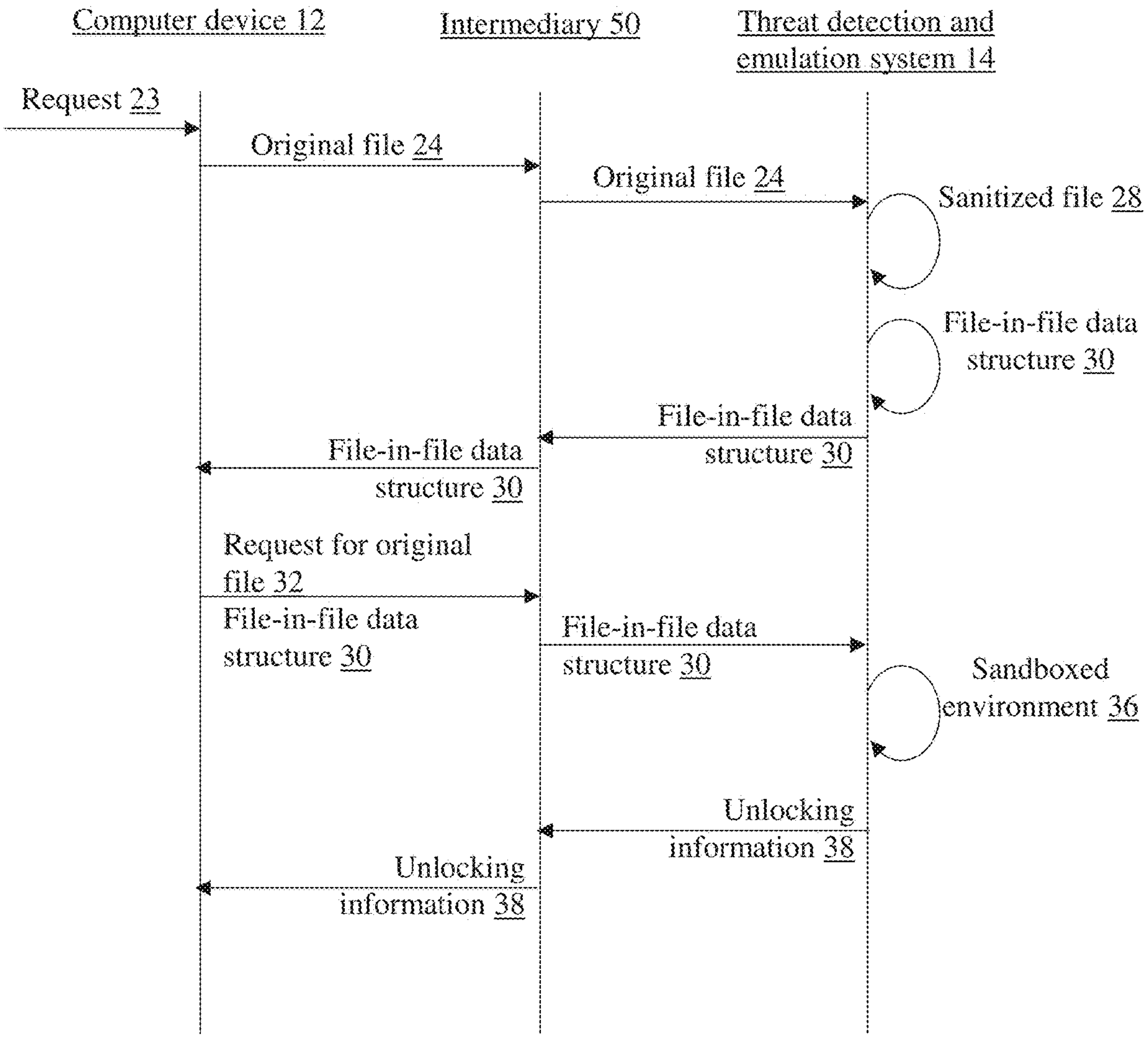
FIG. 4 is a ladder diagram of an alternative embodiment of the system of claim 1 showing operations performed by the computer device, an intermediary, and the threat detection and emulation system.

As shown in FIG. 4, the system 10 may also include an intermediary 50 positioned between the computer device 12 and the threat detection and emulation system 14. The intermediary 50 may manage communication between the computer device 12 and the threat detection and emulation system 14 during threat extraction. That is, the intermediary 50 may receive the requested file 24 sent by the computer device 12 for threat extraction. The intermediary 50 may then send the received requested file 24 to the threat detection and emulation system 14 for threat extraction. When completed, the intermediary 50 may receive the file-in-file data structure 30 output by the threat detection and emulation system 14 and send the received file-in-file data structure 30 to the computer device 12.

The intermediary 50 may also manage communication between the computer device 12 and the threat detection and emulation system 14 during threat emulation. That is, the intermediary 50 may receive the request 32 for the original file 26 from the computer device 12. The intermediary 50 may then send the received request 32 to the threat detection and emulation system 14 for threat emulation. When the original file 26 is identified as benign, the intermediary 50 may receive the unlocking information 38 output by the threat detection and emulation system 14 and send the received unlocking information 38 to the computer device 12.

The intermediary may be any suitable device for directing communication between the computer device 12 and the threat detection and emulation system 14. For example, the intermediary 50 may be implemented as a server including a computer processor configured to execute instructions for performing the intermediary's operations. In some embodiments, the intermediary 50 may be embodied as a software module that is executed by the computer circuitry of the threat detection and emulation system 14, allowing it to interact directly with threat extraction and threat emulation processes without requiring additional hardware. Alternatively, the intermediary 50 may be provided as a browser extension or a mail client executed by the processor circuitry of the computer device 12, thereby integrating with existing user interfaces and workflows.

In addition to routing data between the computer device 12 and the threat detection and emulation system 14, the intermediary 50 may perform auxiliary functions that enhance system performance or security. For instance, the intermediary 50 may apply filtering rules, policy checks, or rate limiting on file requests, ensuring that malicious entities do not flood the threat detection system with extraneous requests. In some embodiments, the intermediary 50 can provide audit logs, analytics, or administrative dashboards that enable IT administrators to monitor file requests, track threat emulation results over time, and adjust policies accordingly.

Figure 5:
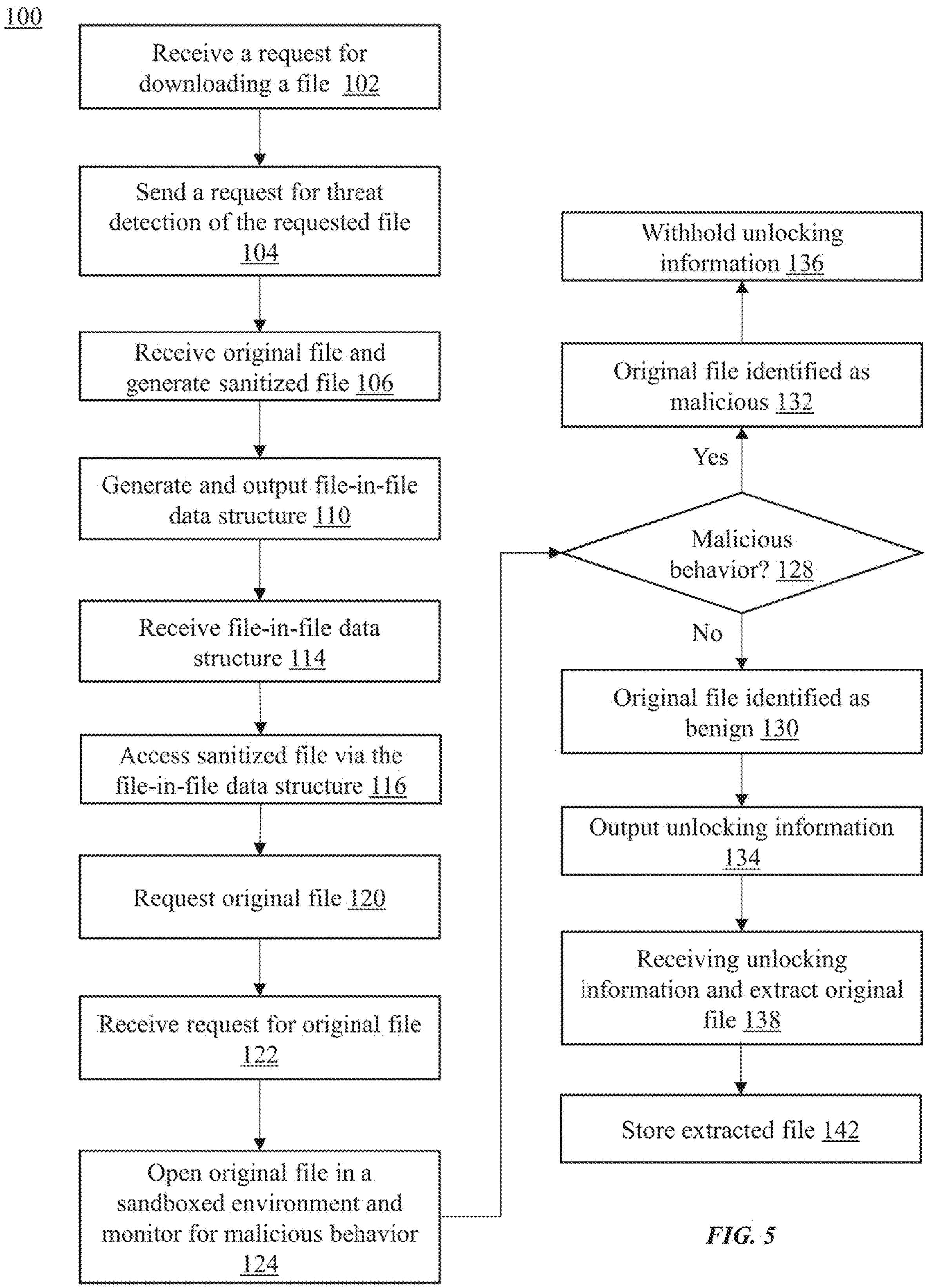
FIG. 5 is a flow diagram of an embodiment of a method implemented by the computer system for securely accessing a downloaded file.

In the embodiment depicted in FIG. 5, a method 100 implemented by the system 10 is shown for securely accessing a downloaded file using a system including a computer device and a threat detection and emulation system. In step 102, the processor circuitry of the computer device receives a request from a user for downloading a file from a remote source. In step 104, the computer device sends a request for threat detection of the requested file by the threat detection and emulation system.

In steps 106 and 110, the computer circuitry of the threat detection and emulation system performs threat detection. In step 106, the requested file is received as an original file and a sanitized file is generated from the original file. In step 110, a file-in-file data structure is generated and output by embedding the original file in the sanitized file.

In step 114, the computer device receives the file-in-file data structure output from the threat detection and emulation system. In step 116, the computer device accesses the sanitized file via the file-in-file data structure. In step 120, the computer device requests the original file.

In steps 122, 124, 128, 130, 132, 134, and 136, the computer circuitry of the threat detection and emulation system performs threat emulation. In step 122, the request for the original file is received. In step 124, the original file is opened in a sandboxed environment and the sandboxed environment is monitored to detect whether the opening of the original file resulted in malicious behavior.

In step 128, a check is performed to determine if malicious behavior was detected. When malicious behavior is not detected, processing moves to step 130. Otherwise, processing moves to step 132. In step 130 (i.e., when no malicious behavior was detected), the original file is identified as benign. Following step 130, in step 134, unlocking information is output for extracting the original file from the file-in-file data structure. Conversely, in step 132 (i.e., when malicious behavior was detected), the original file is identified as malicious. Following step 132, in step 136, the unlocking information is withheld.

In step 138, when the original file is identified as benign, the computer device receives the unlocking information and extracts the original file from the file-in-file data structure using the unlocking information. In step 142, the computer device stores the extracted original file in a memory of the computer device.

The processor circuitry 18 and computer circuitry 22 may have various implementations. For example, the processor circuitry 18 and computer circuitry 22 may include any suitable device, such as a processor (e.g., CPU), programmable circuit, integrated circuit, memory and I/O circuits, an application specific integrated circuit, microcontroller, complex programmable logic device, other programmable circuits, or the like. The processor circuitry 18 and computer circuitry 22 may be located on one or more discrete and separate pieces of hardware. The processor circuitry 18 and computer circuitry 22 may also include a non-transitory computer readable medium, such as random-access memory (RAM), a read-only memory (ROM), an erasable programmable read-only memory (EPROM or Flash memory), or any other suitable medium. Instructions for performing the method described below may be stored in the non-transitory computer readable medium and executed by the processor circuitry 18 and computer circuitry 22. The processor circuitry 18 and computer circuitry 22 may be communicatively coupled to the computer readable medium and communication interface through a system bus, mother board, or using any other suitable structure known in the art.

When the computer device, threat detection and emulation system, or intermediary are described as performing certain actions or steps, it should be understood that these actions or steps are executed by processing hardware integrated within these components. In other words, the processor circuitry, computer circuitry, or computer processor present in each entity is configured to conduct the described operations.

The computer device 12, threat detection and emulation system 14, and intermediary may both include a network interface for exchanging data—such as original files, sanitized files, file-in-file data structures, unlocking information requests, etc. That is, reference above to the computer circuitry or processor circuitry sending data may be accomplished by the computer circuitry/processor circuitry causing a respective network interface to send the data. Similarly, above reference to the computer circuitry or processor circuitry receiving data may be accomplished by the computer circuitry/processor circuitry receiving the data from the respective network interface.

The network interface may comprise a wireless network adaptor, an Ethernet network card, or any suitable device that provides an interface to a network. The network interface may be communicatively coupled to the memory, such that the network interface is able to send data stored on the memory across the network and store received data on the memory. The network interface may also be communicatively coupled to the circuitry (e.g., computer circuitry or processor circuitry) such that the circuitry is able to control operation of the communication interface. The network interface, memory, and circuitry may be communicatively coupled through a system bus, mother board, or using any other suitable manner as will be understood by one of ordinary skill in the art.

In certain embodiments, the network connecting these components may be a secure enterprise network, a virtual private network (VPN), or a cloud-based infrastructure leveraging encrypted communication protocols like HTTPS or TLS. The network may incorporate intrusion detection systems (IDS), firewalls, and network monitoring tools to maintain robust security postures. Additionally, load balancers and failover mechanisms may be implemented to ensure high availability, allowing the threat detection and emulation system 14 to manage large volumes of file requests seamlessly and maintain service continuity even in the event of a component failure or maintenance downtime.

The memory 16 may be any suitable computer readable medium, such as one or more of a buffer, a flash memory, a hard drive, a removable media, a volatile memory, a non-volatile memory, a random-access memory (RAM), or other suitable device. In a typical arrangement, the memory 16 may include a non-volatile memory for long term data storage and a volatile memory that functions as system memory for the processor 16. The memory 16 may exchange data with the processor circuitry 18 and computer circuitry 22 over a data bus. Accompanying control lines and an address bus between the memory 16 and the processor circuitry 18 and computer circuitry 22 may also be present. The memory 16 is considered a non-transitory computer readable medium.

The computer device 12 may encompass a range of configurations and designs. For example, the computer device (also referred to as a computer) 12 may be implemented as a single device, such as a server, desktop computer, laptop, or other standalone units. These individual devices may incorporate essential components like a central processing unit (CPU), memory modules (including random-access memory (RAM) and read-only memory (ROM)), storage devices (like solid-state drives or hard disk drives), and various input/output (I/O) interfaces. Alternatively, the computer device might constitute a network of interconnected computer devices, forming a more complex and integrated system. This could include server clusters, distributed computing environments, or cloud-based infrastructures, where multiple devices are linked via network interfaces to work cohesively, often enhancing processing capabilities, data storage, and redundancy.

The threat detection and emulation system 14 may be implemented in a variety of configurations and system architectures. For example, the threat detection and emulation system 14 may be realized as a single server deployed on-premises, functioning as a dedicated security appliance configured to perform threat extraction and threat emulation operations on files received from one or more external sources. In another embodiment, the system may be implemented as a cloud-based service running on distributed computing platforms and accessible through standard network protocols, allowing for seamless integration with web-based applications, email gateways, or file-sharing platforms. Alternatively, the threat detection and emulation system may be composed of a networked array of interconnected servers, each equipped with specialized hardware and software components that collectively manage file ingestion, threat analysis, and content delivery. Such architectures can scale to manage large volumes of file traffic, enhance system redundancy, and improve overall performance and responsiveness. In addition, hybrid implementations that combine on-premises servers with cloud-based resources may be employed to provide flexible deployment options, improved fault tolerance, and efficient utilization of computing resources, storage, and networking capabilities.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The above-described processes including portions thereof can be performed by software, hardware, and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A system for securely accessing a downloaded file comprising:

- a threat detection and emulation system comprising an electronic device including computer circuitry configured to perform threat extraction by:
  - receiving a requested file as an original file;
  - generating from the original file a sanitized file;
  - generating a file-in-file data structure by embedding the original file in the sanitized file comprising at least one of:
    - obfuscating a location of the original file in the sanitized file; or
    - encrypting the original file;
  - outputting the generated file-in-file;
- a computer device including a memory and processor circuitry configured to:
  - receive a request from a user for downloading a file from a remote source;
  - send a request for threat detection of the requested file by the threat detection and emulation system;
  - receive the file-in-file data structure output from the threat detection and emulation system;
  - access the sanitized file via the file-in-file data structure; and
  - request the original file;
- wherein the computer circuitry of the threat detection and emulation system is further configured to perform threat emulation by:
  - receiving the request for the original file, wherein the request includes the file-in-file data structure;
  - opening the original file included in the file-in-file data structure in a sandboxed environment;
  - monitoring the sandboxed environment to detect whether the opening of the original file resulted in malicious behavior;
  - when the monitoring of the sandboxed environment does not detect malicious behavior, identifying the original file as benign;
  - when the monitoring of the sandboxed environment does detect malicious behavior, identifying the original file as malicious;
  - when the original file is identified as benign, outputting unlocking information for extracting the original file from the file-in-file data structure; and
  - when the original file is identified as malicious, withholding the unlocking information for extracting the original file from the file-in-file data structure;
- wherein the processor circuitry of the computer device is further configured to, when the original file is identified as benign:
  - receive the unlocking information, wherein the unlocking information includes the location of the original file within the file-in-file data structure, thereby enabling extraction of the original file;
  - extract the original file from the file-in-file data structure using the unlocking information; and
  - store the extracted original file in the memory of the computer device.

2. The system of claim 1, wherein the unlocking information includes a decryption key for decrypting the original file within the file-in-file data structure, thereby enabling extraction of the original file.

3. The system of claim 1, further comprising an intermediary configured to:

- receive the requested file sent by the computer device for threat extraction;
- send the received requested file to the threat detection and emulation system for threat extraction;
- receive the file-in-file data structure output by the threat detection and emulation system;
- send the received file-in-file data structure to the computer device;
- receive the request for the original file from the computer device;
- send the received request to the threat detection and emulation system for threat emulation; and
- when the original file is identified as benign:
  - receive the unlocking information output by the threat detection and emulation system; and
  - send the received unlocking information to the computer device.

4. The system of claim 3, wherein the intermediary comprises at least one of:

- a server including a computer processor;
- a software module executed by the computer circuitry of the threat detection and emulation system; or
- a browser extension or a mail client executed by the processor circuitry of the computer device.

5. The system of claim 1, wherein:

the request for the original file includes the received file-in-file data structure; and the computer circuitry of the threat detection and emulation system is configured to receive the request for the original file including the file-in-file data structure before opening the original file in the sandboxed environment, such that the threat emulation is performed upon receiving the request for the original file.

6. The system of claim 1, wherein the computer circuitry of the threat detection and emulation system is configured to:

perform threat emulation upon receiving the original file for threat extraction and before receiving the request for the original file, such that the threat emulation is initiated automatically;

receive the request for the original file; and after receiving the request for the original file and when the original file is identified as benign, outputting the unlocking information.

7. The system of claim 1, wherein:

when the original file is identified as malicious, the computer circuitry is configured to output a notification that the original file has been identified as malicious.

8. The system of claim 1, wherein the unlocking information specifies at least one of a byte offset, an embedded object identifier, or a reference to a specific file component that identifies the concealed original file within the file-in-file data structure.

9. The system of claim 1, wherein:

the sanitized file is a PDF file, and embedding comprises splitting the original file into multiple parts and embedding the multiple parts within the sanitized PDF file; and the unlocking information identifies respective locations of the multiple parts within the sanitized PDF file.

10. The system of claim 1, wherein the sanitized file is a DOCX file, and embedding comprises unzipping the sanitized DOCX file and storing the original DOCX file within the sanitized DOCX file such that the sanitized DOCX file remains accessible as a normal DOCX file.

11. A computer device for securely accessing a downloaded file by interfacing with a threat detection and emulation system, wherein the computer device comprises a memory and processor circuitry configured to:

receive a request for downloading a file from a remote source;

send a request for threat detection of the requested file by the threat detection and emulation system;

receive a file-in-file data structure output from the threat detection and emulation system, wherein the file-in-file data structure includes:

a sanitized version of the requested file generated by the threat detection and emulation system as a sanitized file; and the requested file as an original file embedded in the sanitized file, wherein the original file was embedded in the sanitized file by at least one of:

obfuscating a location of the original file in the sanitized file; or encrypting the original file;

access the sanitized file via the file-in-file data structure;

send a request for the original file, including the file-in-file data structure, after threat emulation is performed by the threat detection and emulation system, such that the threat detection and emulation system:

opens the original file included in the file-in-file data structure in a sandboxed environment;

monitors the sandboxed environment to detect whether the opening of the original file resulted in malicious behavior;

when the monitoring of the sandboxed environment does not detect malicious behavior, identifies the original file as benign and outputting unlocking information for extracting the original file from the file-in-file data structure; and when the monitoring of the sandboxed environment does detect malicious behavior, identifies the original file as malicious; and when the original file is identified as benign:

receive unlocking information, wherein the unlocking information includes the location of the original file within the file-in-file data structure, thereby enabling extraction of the original file;

extract the original file from the file-in-file data structure using the unlocking information; and store the extracted original file in the memory of the computer device.

12. The computer device of claim 11, wherein the unlocking information includes at least one of:

a location of the original file within the file-in-file data structure, thereby enabling extraction of the original file; or a decryption key for decrypting the original file within the file-in-file data structure, thereby enabling extraction of the original file.

13. The computer device of claim 11, wherein:

the request for the original file includes the received file-in-file data structure; and the threat detection and emulation system is configured to receive the request for the original file including the file-in-file data structure before opening the original file in the sandboxed environment, such that the threat emulation is performed upon receiving the request for the original file.

14. The computer device of claim 11, wherein the threat detection and emulation system is configured to:

receive the original file for threat extraction;

perform threat emulation upon receiving the original file for threat extraction and before receiving the request for the original file, such that the threat emulation is initiated automatically;

receive the request for the original file; and after receiving the request for the original file and when the original file is identified as benign, outputting the unlocking information.

15. A method for securely accessing a downloaded file using a system including a computer device and a threat detection and emulation system, the method comprising:

receiving with a processor circuitry of the computer device a request from a user for downloading a file from a remote source;

sending with the processor circuitry a request for threat detection of the requested file by the threat detection and emulation system;

a computer circuitry of the threat detection and emulation system performing threat extraction by:

receiving the requested file as an original file;

generating from the original file a sanitized file;

generating a file-in-file data structure by embedding the original file in the sanitized file comprising at least one of:

obfuscating a location of the original file in the sanitized file, or encrypting the original file; and outputting the generated file-in-file;

receiving with the processor circuitry the file-in-file data structure output from the threat detection and emulation system;

accessing with the processor circuitry the sanitized file via the file-in-file data structure;

requesting the original file;

the computer circuitry of the threat detection and emulation system performing threat emulation by:

receiving the request for the original file, wherein the request includes the file-in-file data structure;

opening the original file included in the file-in-file data structure in a sandboxed environment;

monitoring the sandboxed environment to detect whether the opening of the original file resulted in malicious behavior;

when the monitoring of the sandboxed environment does not detect malicious behavior, identifying the original file as benign;

when the monitoring of the sandboxed environment does detect malicious behavior, identifying the original file as malicious;

when the original file is identified as benign, outputting unlocking information for extracting the original file from the file-in-file data structure; and when the original file is identified as malicious, withholding the unlocking information for extracting the original file from the file-in-file data structure;

when the original file is identified as benign, the processor circuitry:

receiving the unlocking information, wherein the unlocking information includes the location of the original file within the file-in-file data structure, thereby enabling extraction of the original file;

extracting the original file from the file-in-file data structure using the unlocking information; and storing the extracted original file in a memory of the computer device.

16. The method of claim 15, wherein the unlocking information includes a decryption key for decrypting the original file within the file-in-file data structure, thereby enabling extraction of the original file.

17. The method of claim 15, further comprising:

receiving with an intermediary the requested file sent by the computer device for threat extraction;

sending with the intermediary the received requested file to the threat detection and emulation system for threat extraction;

receiving with the intermediary the file-in-file data structure output by the threat detection and emulation system;

sending with the intermediary the received file-in-file data structure to the computer device;

receiving with the intermediary the request for the original file from the computer device;

sending with the intermediary the received request to the threat detection and emulation system for threat emulation; and when the original file is identified as benign, the intermediary:

receiving the unlocking information output by the threat detection and emulation system; and sending the received unlocking information to the computer device.

18. The method of claim 17, wherein the intermediary comprises at least one of:

a server including a computer processor;

a software module executed by the computer circuitry of the threat detection and emulation system; or a browser extension or a mail client executed by the processor circuitry of the computer device.

19. The method of claim 15, wherein the computer circuitry of the threat detection and emulation system:

receives the request for the original file including the file-in-file data structure before opening the original file in the sandboxed environment, such that the threat emulation is performed upon receiving the request for the original file; or performs threat emulation upon receiving the original file for threat extraction and before receiving the request for the original file, such that the threat emulation is initiated automatically.

* * * * *